United States Patent [19]

Schneider

[11] Patent Number: 5,171,185
[45] Date of Patent: Dec. 15, 1992

[54] TELESCOPIC TRIPOD UNIVERSAL JOINT

[75] Inventor: Dean J. Schneider, Highland, Mich.

[73] Assignee: GKN Automotive, Inc., Auburn Hills, Mich.

[21] Appl. No.: 734,464

[22] Filed: Jul. 23, 1991

[51] Int. Cl.⁵ .............................................. F16D 3/20
[52] U.S. Cl. .................................... 464/111; 464/124; 464/905
[58] Field of Search ............... 464/111, 120, 123, 124, 464/132, 905

[56] References Cited

U.S. PATENT DOCUMENTS

| | | | |
|---|---|---|---|
| 4,379,706 | 4/1983 | Otsuka et al. | 464/111 |
| 4,578,048 | 3/1986 | Hirari et al. | 464/111 |
| 4,619,628 | 10/1986 | Orain | 464/111 |
| 4,674,993 | 6/1987 | Mazziotti et al. | 464/111 |
| 4,747,803 | 5/1988 | Kimata et al. | 464/111 |
| 4,773,890 | 9/1988 | Iwasaki et al. | 464/111 |
| 4,786,270 | 11/1988 | Iwasaki | 464/111 |
| 4,854,917 | 8/1989 | Mizukoshi | 464/111 |
| 4,891,035 | 1/1990 | Sasaki et al. | 464/111 |
| 4,954,119 | 9/1990 | Sasaki et al. | 464/111 |
| 4,971,595 | 11/1990 | Sasaki et al. | 464/111 |
| 5,019,016 | 5/1991 | Uchman | 464/111 |

FOREIGN PATENT DOCUMENTS

| | | | |
|---|---|---|---|
| 426186 | 5/1991 | European Pat. Off. | 464/111 |
| 2226102 | 6/1990 | United Kingdom . | |
| 2237618 | 5/1991 | United Kingdom | 464/111 |

*Primary Examiner*—Daniel P. Stodola
*Assistant Examiner*—William G. Battista, Jr.
*Attorney, Agent, or Firm*—Harness, Dickey & Pierce

[57] ABSTRACT

A plunging tripod constant velocity universal joint consists of an outer joint member with a cavity having three longitudinal chambers. An inner joint member is displaced within this cavity. The inner joint member consists of a spider member and three sets of roller assemblies. The roller assemblies each have an annular inner roller, an annular outer roller and a plurality of needle rollers. The inner and outer rollers are provided with flanges which form a pocket to retain the plurality of needles without the use of snap rings.

6 Claims, 4 Drawing Sheets

TELESCOPIC TRIPOD UNIVERSAL JOINT

BACKGROUND OF THE INVENTION

The invention relates to universal joints and, more particularly, to a telescopic tripod universal joint.

Tripod constant velocity universal joints have been used by the transportation industry for numerous years. A typical tripod joint is shown in U.S. Pat. No. 4,773,890 issued to Iwasaki et.al. on Sep. 27, 1988.

This joint consists of an outer race formed with three longitudinal chambers. A spider assembly is disposed within each chamber. Journaled on each of the spider trunnions is a roller. Interposed between each roller and the respective trunnion is a plurality of needle roller bearings.

While this joint has proven to be an effective design, it has several disadvantages. One disadvantage is during operation of the tripod joint at angle, the joint produces a third order axial cyclic vibration known as "shudder". This shudder phenomenon often times is felt by the driver and passengers of the vehicle.

Shudder is caused by sliding rather than rolling of the rollers when the joint is rotating at an angle. While at an angle, the plane of rotation of each roller is skewed relative to its respective outer race track. This causes a combination of rolling and sliding of the roller on its respective track as the spider moves axially relative to the outer race. This sliding action is the main component producing the third order axial cyclic vibration or shudder. As the angle of the joint increases, there is more sliding and therefore a higher axial load is induced.

There are numerous designs which attempt to minimize the axially induced force. Iwasaki et al. patent attempts to reduce this induced load by using angular contact on the tracks. This has the effect of lowering the surface area of contact between the roller and the track. While some reduction in load is possible with this joint, it does not significantly reduce the shudder phenomenon.

U.S. Pat. No. 4,619,628 issued to Orain on Oct. 28, 1986 illustrates a triplan joint which separates the components within the joint which are responsible for angular and translational movement. While this device is able to significantly reduce or even eliminate the axially induced forces in the joint, the design of the joint is complicated and expensive.

Various other patents have approached the problem by going to multiple piece roller assemblies in an attempt to reduce the "shudder" phenomenon.

U.S. Pat. No. 4,954,119 issued to Sasaki et al. on Sep. 4, 1990; U.S. Pat. No. 4,891,035 issued to Sasaki et al. on Jan. 2, 1990; U.S. Pat. No. 4,854,917 issued to Mizukoshi on Aug. 8, 1989; U.S. Pat. No. 4,786,270 issued to Iwasaki on Nov. 22, 1988; U.S. Pat. No. 4,747,803 issued to Kimata et al. on May 31, 1988; U.S. Pat. No. 4,578,048 issued to Hirai et al. on Mar. 25, 1986 and U.S. Pat. No. 4,379,706 issued to Otsuka et al. on Apr. 12, 1983 all illustrate different designs of multi-component roller design.

The capability of the above enumerated tripod joints to reduce the axially induced load lies somewhere between a typical tripod as shown in Iwasaki et al. and a triplan joint as shown in Orain. While these joints all reduce the axially induced load, they all are relatively expensive due to the design of their complicated multi-component roller assembly.

Accordingly, it is desirous to have a multi-component roller assembly which reduces the axially induced loads and is relatively inexpensive and reliable.

SUMMARY OF THE INVENTION

The present invention discloses an improved tripod telescopic joint. The present invention discloses a multi-component roller assembly for a tripod telescopic joint. The roller assembly journals the plurality of needle rollers between the inner and outer roller without the use of snap rings. This not only eliminates the snap rings, but also eliminates the costly machining of the snap ring grooves.

From the following detailed description of the present invention taken in conjunction with the accompanying drawings and claims, other objects and advantages of the present invention will become apparent to those skilled in the art.

DETAILED DESCRIPTION OF THE PREFERRED EMBODIMENT

Figure 1:
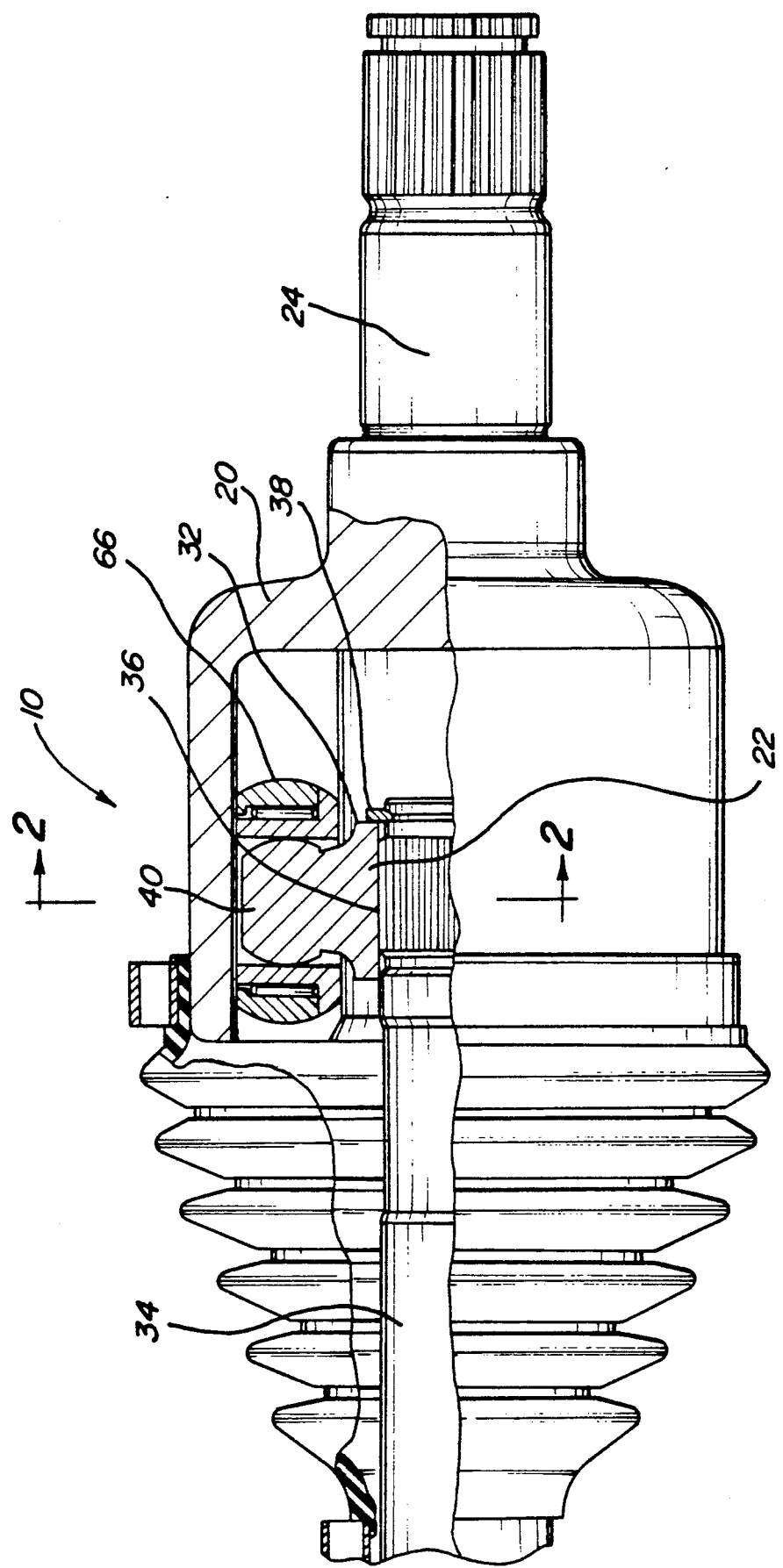
FIG. 1 is a side elevation view partially in cross section of a tripod joint assembly in accordance with the present invention.
Figure 2:
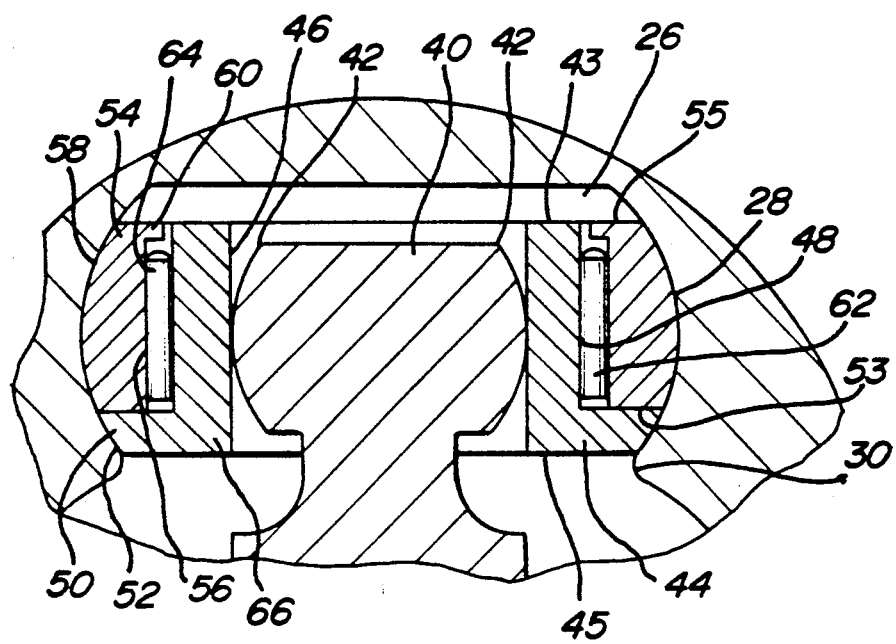
FIG. 2 is a sectional view of FIG. 1 along line 2—2 thereof.
Figure 6:
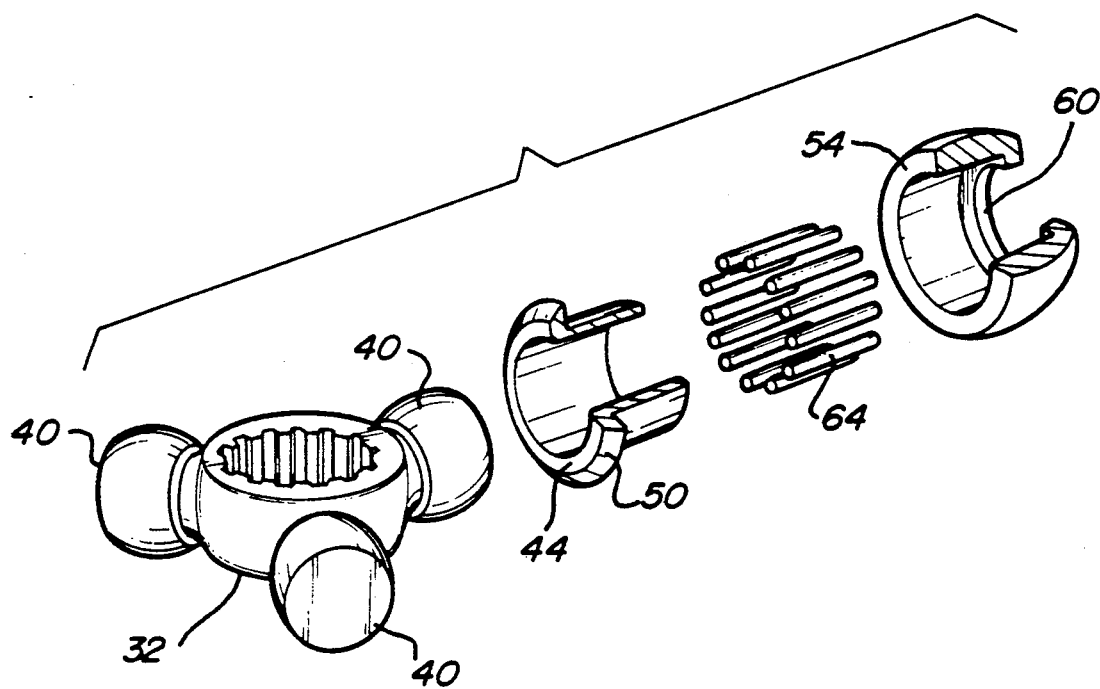
FIG. 6 is a perspective view of a tripod spider assembly in accordance with the present invention.

A telescopic universal joint in accordance with the present invention is shown in FIGS. 1, 2 and 6 and is designated by the reference number 10. The telescopic tripod universal joint 10 has an outer member 20 and an inner member 22.

The outer joint member 20 is a bell shaped housing and is rotatable about an axis 24. The bell shaped housing 20 has three longitudinal chambers 26 formed in its interior wall. The chambers 26 are generally parallel to the axis 24. Each of the longitudinal chambers 26 are defined by opposing longitudinal sidewalls 28 which are generally parallel to the axis 24. Each of longitudinal sidewalls 28 includes a longitudinal guideway 30.

The inner joint assembly 22 includes spider member 32, shaft 34 and roller assembly 66. The spider 32 may be integral or separate with the shaft 34. When the spider 32 is separate from the shaft 34, it is secured by spline means 36 and snap ring 38. The spider 32 has three equally circumferentially spaced and radial extending trunnions 40. Each trunnion is adapted to extend into one of the chambers 26 as shown in FIG. 2. The trunnions 40 have a partially spherical exterior surface portion 42.

The roller assembly 66 is positioned in sliding engagement with the partially spherical exterior surface portion 42 of the trunnion 40. The roller assembly 66 has an annular inner roller 44, an annular outer roller 54 and a plurality of needle rollers 64.

The inner roller 44 has a pair of lateral ends 43 and 45 with an inner cylindrical surface 46 between the ends. The surface 46 is in sliding contact with the partially spherical exterior surface portion 42 of the trunnion 40. The inner roller 44 has an outer cylindrical surface 48 between ends 43 and 45 which acts as a bearing surface. The inner roller 44 also has an outwardly extending flange 50 at end 45. The flange 50 extends radially outward and terminates with a partially spherical or cylindrical exterior surface portion 52.

The outer roller 54 has a pair of lateral ends 53 and 55 with an inner cylindrical surface 56 and an outer partially spherical or cylindrical surface 58 between the ends 53 and 55. The inner cylindrical surface 56 provides a bearing surface for needle rollers 64. The outer surface 58 is in rolling contact with the longitudinal side walls 28 of the outer joint member 20. The shape of the longitudinal sidewall 28 is complimentary to the partial spherical or cylindrical surface 58. The outer roller 54 also has an inwardly extending flange 60 located at end 55.

The longitudinal guideway 30 traps the roller assembly in the chamber 26 and allows only movement of the roller assembly 66 along a path which is generally parallel to the axis 34. Skewing of the roller assembly 66 relative to the longitudinal sidewall 28 is thus minimized.

When the inner roller 44 and the outer roller 54 are positioned as shown in FIG. 2, a pocket 62 is formed between the inner cylindrical surface 56 of the outer roller 54 and the outer cylindrical surface 48 of the inner roller 44. A plurality of needle rollers 64 are journaled in the pocket 62 and are in rolling contact with the inner cylindrical surface 56 and the outer cylindrical surface 48.

Figure 3:
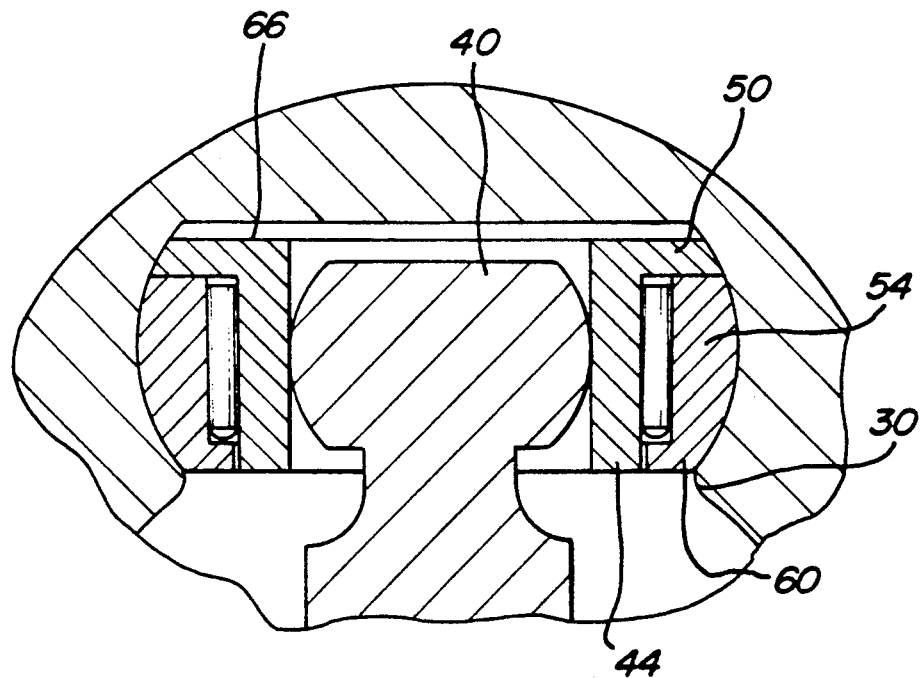
FIG. 3 is a sectional view similar to FIG. 2 showing an alternate orientation of the internal components.

While FIG. 2 shows the outwardly extending flange 50 of the inner roller 44 located towards the inside of the outer member 20, it is within the scope of this invention to rotate the roller assembly 66 180° and have the flange 50 located towards the outside of the outer member 20 as shown in FIG. 3.

Figure 4:
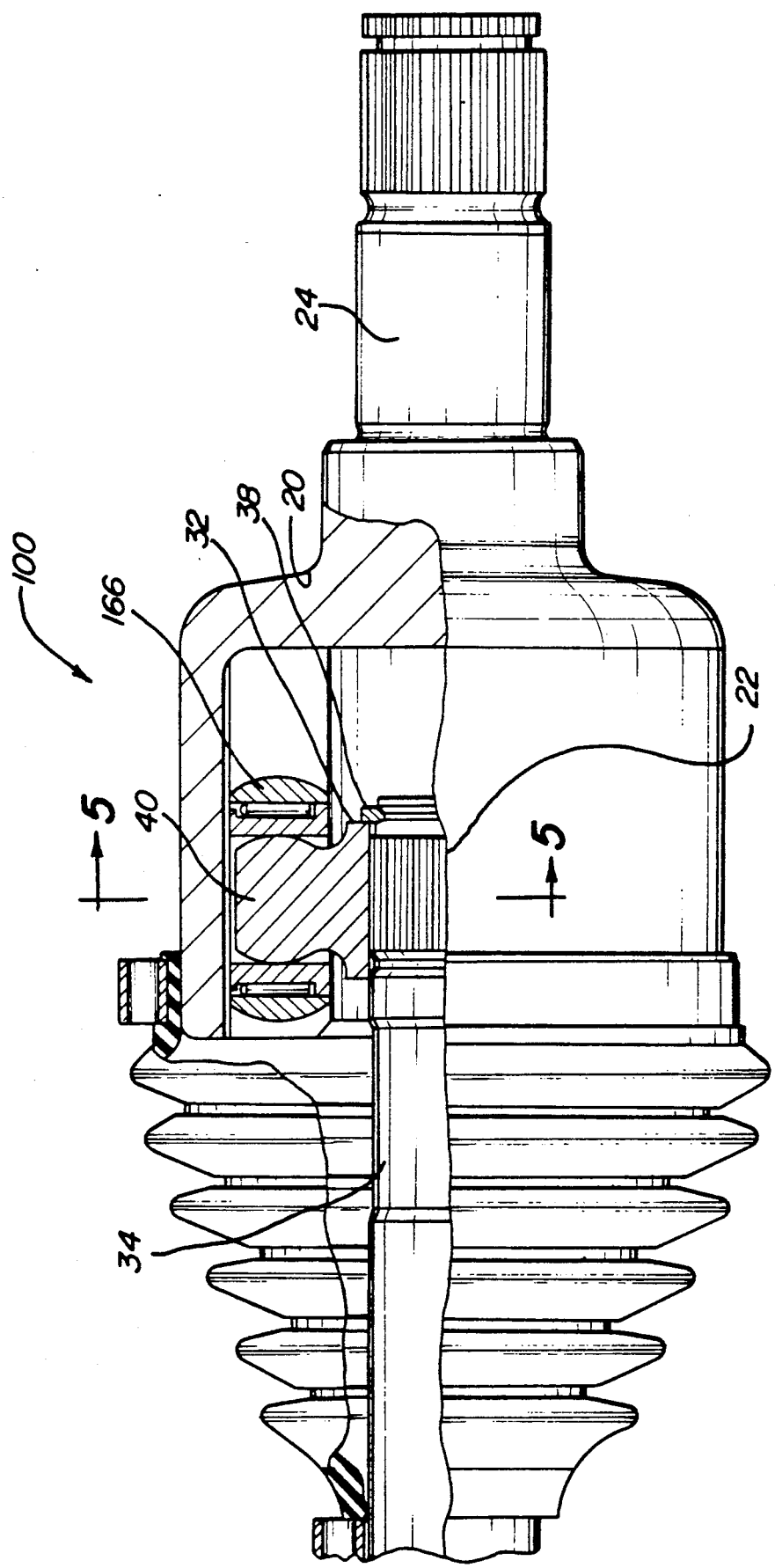
FIG. 4 is a side elevation view like that of FIG. 1 of a tripod joint assembly according to another embodiment of the present invention.
Figure 5:
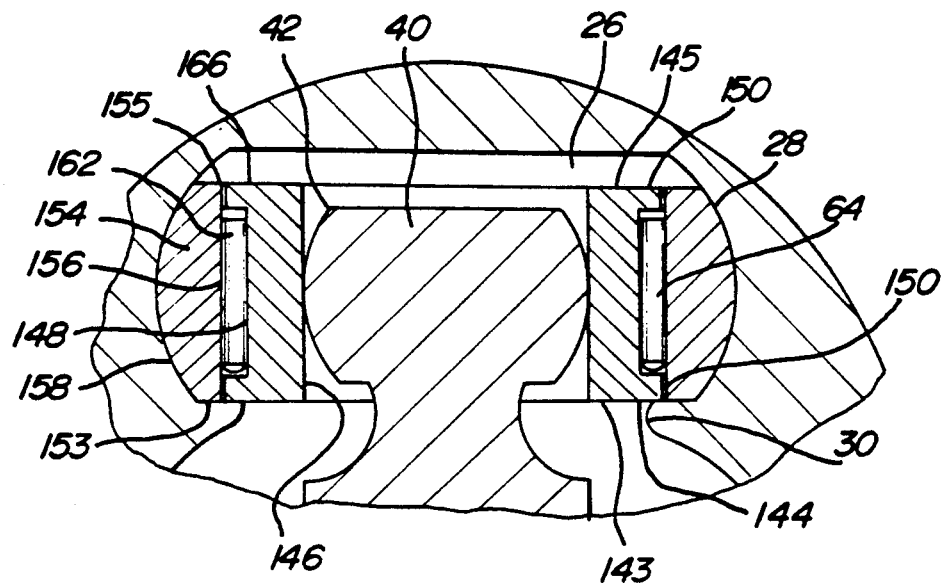
FIG. 5 is a sectional view of FIG. 4 along line 5—5 thereof.

FIGS. 4 and 5 show another embodiment of the present invention. It is designated by the number 100. In the discussion of FIGS. 4 and 5, the elements which are the same as those shown in FIGS. 1 and 2 are designated with the same reference numerals.

The outer member 20, the spider member 32 and the shaft 34 are the same for both embodiments of the invention. The above description of these components also applies to this embodiment.

A roller assembly 166 is positioned in sliding engagement with the partially spherical exterior surface portion 42 of the trunnion 40. The roller assembly 166 has an inner annular roller 144, an outer annular roller 154 and a plurality of needle rollers 64.

The inner roller 144 has a pair of lateral ends 143 and 145 with an inner cylindrical surface 146 between ends 143 and 145. The surface 146 is in sliding contact with the partially spherical exterior surface portion 42 of the trunnion 40. The inner roller 144 also includes an outer cylindrical surface 148 between ends 143 and 145. The inner roller 144 has a pair outwardly extending flanges 150 at both of its ends 143 and 145 as seen in FIG. 5.

The outer roller 154 has a pair of lateral ends 153 and 155 with an inner cylindrical surface 156 and an outer partially spherical or cylindrical surface 158 between ends 153 and 155. The outer surface 158 is in rolling contact with the longitudinal sidewalls 28 of the outer joint member 20. The shape of the longitudinal sidewall 28 is complimentary to the partial spherical or cylindrical surface 158.

The longitudinal guideway 30 traps the roller assembly in the chamber 26 and allows only movement of the roller assembly 166 along a path which is generally parallel to the axis 34. Skewing of the roller assembly 166 relative to the longitudinal sidewall 28 is thus minimized.

When the inner roller 144 and the outer roller 154 are positioned as shown in FIG. 5, a pocket 162 is formed between the inner cylindrical surface 156 of the outer roller 154 and the outer cylindrical surface 148 of the inner roller 144. A plurality of needle rollers 64 are journaled in the pocket 162 and are in rolling contact with the inner cylindrical surface 156 and the outer cylindrical surface 148.

While the above detailed description describes the preferred embodiment of the present invention, it should be understood that the present invention is susceptible to modification, variation and alternation without deviating from the scope and fair meaning of the subjoined claims.

What is claimed is:

1. A homokinetic universal joint comprising:
    an outer joint member having a plurality of circumferentially spaced longitudinally extending chambers, each chamber having a pair of oppositely disposed longitudinal sidewalls;
    an inner joint member disposed within said outer joint member, said inner joint member having a plurality of circumferentially spaced radially extending trunnions equal in number to said plurality of chambers, each trunnion radially extending into a respective chamber between said oppositely disposed longitudinal sidewalls, each of said plurality of trunnions having at least a partial spherical surface facing each of said longitudinal sidewalls provided in said respective chamber into which said trunnion extends;
    a plurality of homogenous annular inner rollers, each annular inner roller having a cylindrical inner wall and an outer wall between a first end and a second end, said cylindrical inner wall slidingly engaged with said partial spherical surface of said trunnion, said outer wall having a first cylindrical bearing surface and an outwardly extending flange at said first end of said inner roller;
    a plurality of homogenous annular outer rollers, each annular outer roller having an inner wall, an outer wall, a first end and a second end, said outer wall rollingly engaged and in conformity with said longitudinal sidewall of said outer member, said inner wall having a second cylindrical bearing surface and an inwardly extending flange at said first end of said inner roller, said inwardly extending flange of said annular outer roller having an internal surface which is adjacent said first cylindrical bearing surface of said annular inner roller, said annular outer roller positioned such that said inwardly extending flange at said first end of said outer roller is adjacent to said second end of said annular inner roller and said outwardly extending flange of said annular inner roller is adjacent to said second end of said annular outer roller, said outwardly extending flange of said annular inner roller having an exterior surface in general alignment with said outer wall of said annular outer roller; said annular inner and outer rollers forming a pocket between said first and second cylindrical bearing surfaces; and a plurality of needle rollers located in said pocket between said first and second cylindrical bearing surfaces, said plurality of needle rollers in continuous rolling contact with both said first and second cylindrical bearing surfaces.

2. The homokinetic universa joint of claim 1 wherein said outer wall of each of said annular rollers is cylindrical and said exterior surface of said outwardly extending flange is cylindrical.

3. The homokinetic universal joint of claim 1 wherein said outer wall of each of said annular outer rollers is spherical and said exterior surface of said outwardly extending flange is spherical.

4. A homokinetic universal joint comprising:

an outer joint member having a plurality of circumferentially spaced longitudinally extending chambers, each chamber having a pair of oppositely disposed longitudinal sidewalls;

an inner joint member disposed within said outer joint member, said inner joint member having a plurality of circumferentially spaced radially extending trunnions equal in number to said plurality of chambers, each trunnion radially extending into a respective chamber between said oppositely disposed longitudinal sidewalls, each of said plurality of trunnions having at least a partial spherical surface facing each of said longitudinal sidewalls provided in said respective chamber into which said trunnion extends;

a plurality of a homogenous annular outer rollers, each outer roller having an inner wall and an outer wall, said outer wall rollingly engaged and in conformity with said longitudinal sidewall of said outer member, said inner wall having a second cylindrical bearing surface;

a plurality of homogenous annular inner rollers, each inner roller having a cylindrical inner wall and an outer wall between a first end an a second end, said cylindrical inner wall slidingly engaged with said partial spherical surface of said trunnion, said outer wall having a first cylindrical bearing surface, an outwardly extending first flange at said first end of said inner roller, and an outwardly extending second flange at said second end of said inner roller; said outwardly extending first and second flanges being adjacent said second cylindrical bearing surface of said annular outer roller and forming a pocket between said outer and inner rollers;

a plurality of needle rollers disposed in said pocket in continuous rolling contact with both said first cylindrical bearing surface of said annular inner rollers and said second cylindrical bearing surface of said annular outer roller.

5. The homokinetic universal joint of claim 4 wherein said outer wall surface of each of said annular outer rollers is cylindrical.

6. The homokinetic universal joint of claim 4 wherein said outer wall surface of each of said annular outer rollers is spherical.

* * * * *